(12) United States Patent
Nakamura et al.

(10) Patent No.: US 9,707,737 B2
(45) Date of Patent: Jul. 18, 2017

(54) COMPOSITE MATERIAL AND ELECTRONIC APPARATUS

(71) Applicant: Panasonic Intellectual Property Management Co., Ltd., Osaka (JP)

(72) Inventors: Taichi Nakamura, Osaka (JP); Shigeaki Sakatani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 55 days.

(21) Appl. No.: 14/885,527

(22) Filed: Oct. 16, 2015

(65) Prior Publication Data

US 2016/0167340 A1 Jun. 16, 2016

(30) Foreign Application Priority Data

Dec. 15, 2014 (JP) ................................. 2014-252613

(51) Int. Cl.
| | |
|---|---|
| *B32B 9/00* | (2006.01) |
| *B32B 5/22* | (2006.01) |
| *G06F 1/20* | (2006.01) |
| *B32B 5/14* | (2006.01) |
| *B32B 7/04* | (2006.01) |
| *B32B 5/02* | (2006.01) |

(Continued)

(52) U.S. Cl.
CPC .............. *B32B 9/007* (2013.01); *B32B 5/022* (2013.01); *B32B 5/142* (2013.01); *B32B 7/045* (2013.01); *B32B 9/04* (2013.01); *B32B 9/047* (2013.01); *B32B 27/281* (2013.01); *B32B 27/32* (2013.01); *B32B 27/36* (2013.01); *G06F 1/203* (2013.01); *B32B 5/22* (2013.01); *B32B 9/045* (2013.01); *B32B 27/12* (2013.01);

(Continued)

(58) Field of Classification Search
None
See application file for complete search history.

(56) References Cited

U.S. PATENT DOCUMENTS

2002/0094426 A1* 7/2002 Stepanian ............ B01J 13/0091
428/292.1
2005/0281988 A1 12/2005 McCormick
(Continued)

FOREIGN PATENT DOCUMENTS

WO 2011/111716 9/2011

OTHER PUBLICATIONS

The Extended European Search Report dated Mar. 31, 2016 for the related European Patent Application No. 15187636.4.

*Primary Examiner* — David Sample
*Assistant Examiner* — Donald M Flores, Jr.
(74) *Attorney, Agent, or Firm* — Panasonic IP Management; Kerry S. Culpepper

(57) ABSTRACT

A composite material includes: a heat dissipation sheet; a heat insulation material that is placed on one surface of the heat dissipation sheet; and a support layer that is placed on at least one of the other surface of the heat dissipation sheet and the other surface of the heat insulation material, wherein silica aerogel is included between fibers in an inner region of the heat insulation material, an outer peripheral region of the heat insulation material includes the fibers, and the heat dissipation sheet and the heat insulation material are fixed onto each other through the fibers. Furthermore, provided is an electronic apparatus, including a heat generating component; and the above composite material, wherein the composite material is placed between the housing and the heat generating component.

11 Claims, 4 Drawing Sheets

(51) Int. Cl.
*B32B 27/28* (2006.01)
*B32B 27/32* (2006.01)
*B32B 27/36* (2006.01)
B32B 9/04 (2006.01)
B32B 27/12 (2006.01)

(52) U.S. Cl.
CPC ....... *B32B 2250/04* (2013.01); *B32B 2250/44* (2013.01); *B32B 2260/021* (2013.01); *B32B 2260/04* (2013.01); *B32B 2262/0253* (2013.01); *B32B 2262/0269* (2013.01); *B32B 2262/0276* (2013.01); *B32B 2262/0284* (2013.01); *B32B 2262/101* (2013.01); *B32B 2262/108* (2013.01); *B32B 2307/102* (2013.01); *B32B 2307/202* (2013.01); *B32B 2307/302* (2013.01); *B32B 2307/304* (2013.01); *B32B 2307/306* (2013.01); *B32B 2307/3065* (2013.01); *B32B 2307/7265* (2013.01); *B32B 2457/00* (2013.01)

(56) References Cited

U.S. PATENT DOCUMENTS

2009/0029109 A1* 1/2009 Seth .................. B32B 5/022
428/158
2013/0065011 A1* 3/2013 Suzuki .................. H01L 23/36
428/77

* cited by examiner

COMPOSITE MATERIAL AND ELECTRONIC APPARATUS

TECHNICAL FIELD

The technical field relates generally to diffusing heat from an electronic component (hereinafter, referred to as "heat generating component") involving heat generation inside a housing of an electronic apparatus, precision apparatus, or the like. Particularly, the technical field, relates to a composite material that can effectively reduce neat transfer from such a heat generating component to the housing.

BACKGROUND

In recent years, a density of heat generation from a heat generating component has rapidly increased with high performance of electronic apparatuses such as smart phones, tablets and notebook computers. Therefore, heat diffusion technologies have been imperative for such electronic apparatuses.

In particular, small-sized mobile apparatuses often come into direct contact with the human body, and temperature elevation outside their housings has become a serious problem. As one problem caused from such temperature elevation of outer surfaces of housings of mobile apparatuses, low-temperature burn injuries can be mentioned. Low-temperature burn injuries are a type of burn injury caused from long-term exposure of the human body to a temperature higher than the body temperature. There has been a report that a burn injury can be caused from the exposure at 44° C. for 6 hours, and that an increase of the temperature by 1° C. reduces the time required to cause the burn injury by half. Compared with usual burn injuries, in most cases of low temperature burn injuries, persons are late in being aware of progression of the symptoms, and there are often cases where their skins are seriously damaged when they are aware of the progression.

Moreover, liquid crystal displays or organic EL displays are used for display devices in mobile apparatuses. However, these display devices are susceptible to heat. When heat generated from heat generating components is transferred to these display devices, such heat transfer becomes a factor causing uneven brightness and deterioration in the shelf life of displays. Therefore, in order to achieve both high performance and size/thickness reduction of mobile apparatuses, it is required that heat transfer to display devices be effectively reduced.

Furthermore, recently, there are many cases where low-temperature burn injuries are caused when small-sized notebook computers are used on the knee for long time. Because miniaturization or mobilization of apparatuses will increasingly proceed in the future, it is very important to suppress the surface temperature of apparatuses as low as possible, even by 1° C.

Meanwhile, as a method for preventing an increase in the surface temperature of an apparatus, use of a heat insulation member can be considered in order to prevent heat from a heat generating component inside a housing of an apparatus from transmitting to the housing.

For example, with regard to a composite material with a conventional laminate structure shown in FIG. 4, use of a composite material with a laminate structure such as an adhesive layer 405/heat conductive layer 404/adhesive layer 403/heat insulation layer 402/adhesive layer 401 has been considered in the direction from a heat insulation component 406 to a housing 407, in order to prevent heat from the heat generating component 406 inside the housing of the apparatus from transmitting to the housing 407. Furthermore, a metal sheet, a graphite sheet and the like for the heat conductive layer 404; and a resin sheet (e.g., unwoven fabric or resin sheet) that contains capsules such as glass beads including the air, for the heat insulation layer 402, have been studied.

According to the above technology, there has been an attempt to homogenize a temperature distribution inside the housing 407 by reducing the heat transfer to the housing 407 (JP-A-2012-504484)

SUMMARY

However, the method described in JP-A-2012-504484 has a problem in which, since adhesive layers are present between the heat generating component and the heat insulation layer, between the heat insulation layer and the heat conductive layer, and between the heat conductive layer and the housing, there is an obstacle to production of thin and small-sized electronic apparatuses.

A composite material according to an embodiment exerts a sufficient heat insulation effect even in a harrow space inside a housing of an electronic apparatus, thereby effectively reducing heat transfer from a heat generating component to the housing, as well as an electronic apparatus using the composite material.

The composite material includes: a heat dissipation sheet; a heat insulation material that is placed on one surface of the heat dissipation sheet; and a support layer that is placed on at least one of the other surface of the heat dissipation sheet and the other surface of the heat insulation material, wherein silica aerogel is included between fibers in an inner region of the heat insulation material, an outer peripheral region of the heat insulation material includes the fibers, and the heat dissipation sheet and the heat insulation material are fixed onto each other through the fibers.

Furthermore, an electronic apparatus, includes: a housing; a heat generating component; and the above-described composite material, wherein the composite material is placed between the housing and the heat generating component.

Accordingly, a composite material that exerts a sufficient heat insulation effect even in a narrow space inside a housing of an electronic apparatus, thereby effectively reducing heat transfer from a heat generating component to the housing can be provided.

DESCRIPTION OF EMBODIMENTS

Figure 1:
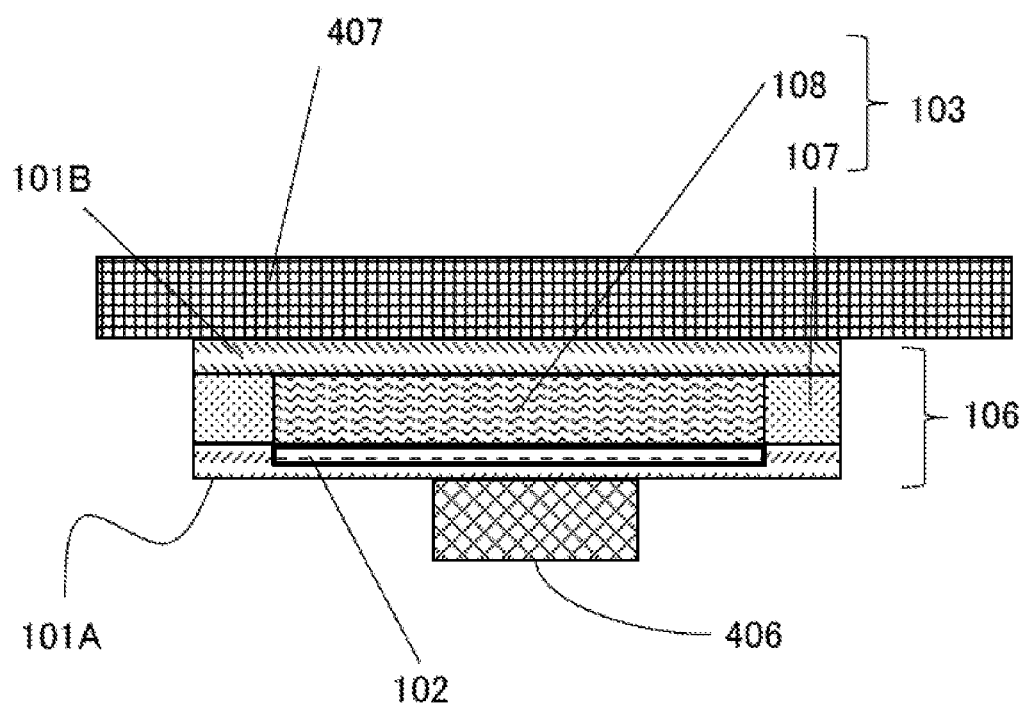
FIG. 1 shows a diagram of a composite material according to an embodiment.

A cross-section diagram of the inside of an electronic apparatus 100 according to an embodiment is shown in FIG.

1. A composite material 106 includes a graphite sheet 102 as a heat dissipation sheet, and a heat insulation material 103 on one side of the graphite sheet 102. Furthermore, a film-like support layer 101A and a film-like support layer 101B are each present on the upper and lower surfaces. An area of the heat insulation material 103 is larger than an area of the graphite sheet 102, when viewing the upper surface (in a planar view).

An unwoven fabric 107 is present throughout the heat insulation material 103, and silica aerogel 108 is located in its inner portion. The silica aerogel 108 is not present in an outer peripheral portion of the heat insulation material 103, and only the unwoven fabric 107 is present therein. By fixing the unwoven fabric 107, the support layer 101A and the support layer 101B onto one another with thermocompression bonding, a laminate can be fixed without using any adhesive layer.

The composite material 106 is used in a state where it is placed between a housing 407 and a heat generating component 406. It allows the heat from the heat generating component 406 to spread, and suppresses the temperature rise of the heat generating component 406, and the local temperature rise of the housing 407.

<Unwoven Fabric 107>

The unwoven fabric 107 is not limited to an unwoven fabric, and those obtained by knitting fibers in a regular manner may be used therefor. Fiber sheets obtained by use of various knitting methods may also be used therefor. However, an unwoven fabric is preferable, because it is easier to incorporate aerogel into an unwoven fabric than into such fiber sheets obtained by various knitting methods. The unwoven fabric 107 may be made from a resin fiber such as polyethylene, polypropylene, polyester, or aramid.

<Graphite Sheet 102>

The graphite sheet 102 serves as a heat dissipation sheet. The heat from the heat generating component 406, which is a heat source, is diffused within the graphite sheet 102, thereby cooling the heat source. For example, the graphite sheet 102 may be a metal, sheet, e.g., an aluminum sheet. However, the following graphite sheet 102 is preferable, because it has superior heat conductive properties.

<Heat Conductivity in the Planar Direction of the Graphite Sheet 102>

A heat conductivity in the planar direction of the graphite sheet 102 used herein is preferably 1000 W/m·K or more. If the heat conductivity is lower than 1000 W/m·K, sufficient heat diffusion to the planar direction may not occur, and the heat may be conveyed to the thickness direction. Additionally, the heat conductivity of the graphite sheet 102 can be calculated according to the following formula (1):

$$\lambda = \alpha \times d \times Cp \qquad (1)$$

wherein $\lambda$ represents a heat conductivity, $\alpha$ represents a thermal diffusivity, d represents a density, and Cp represents a specific heat capacity.

<Heat Conductivity in the Thickness Direction of the Graphite Sheet 102>

A heat conductivity in the thickness direction of the graphite sheet 102 depends on a thickness of the graphite sheet 102 used herein. In order to effectively diffuse heat generated from the heat source to the in-plane direction, the heat conductivity in the thickness direction is preferably 20 W/m·K or less when the thickness is 100 μm or less. In other words, when the thickness is small, the heat conductivity in the thickness direction is reduced so as to prevent the heat from, transmitting to the thickness direction.

When the heat conductivity in the thickness direction is larger than 20 W/m·K, an effect to diffuse the heat generated from the heat generating component 406 to the in-plane direction may become insufficient, and the heat may be conveyed to the side of the housing 407.

In the same manner, when, the thickness is 80 μm or less, the heat conductivity in the thickness direction is preferably 18 W/m·K or less.

<Thickness of the Graphite Sheet 102>

Recent electronic apparatus 100 continue to become thinner, and therefore, a space inside a housing 407 of the apparatus in which electronic components can be mounted has become very narrow. Consequently, it is difficult to incorporate a film with a thickness of 100 μm or more into the housing 407 of such an electronic apparatus 100.

Therefore, the thickness of the graphite sheet 102 used herein is preferably smaller than 100 μm in terms of the space inside the housing 407 of the electronic apparatus 100.

<Method for Producing the Graphite Sheet 102>

As a material for the graphite sheet 102, a film of a polymer that is selected from among an aromatic polyimide, an aromatic polyamide, and a polyoxadiazole, and that has a thickness within a range of 1 μm to 400 μm can be used. The thickness of the polymer film is preferably within a range of 1 μm to 125 μm. Additionally, a graphite sheet with a thickness of about 100 μm is prepared from a polymer film with a thickness of 75 μm, although it depends on conditions.

The graphite sheet is produced through the following steps: a carbonaceous film conversion step in which a polymer film is subjected to a heat treatment within a temperature range of 450° C. to 2000° C. to convert the polymer film to a carbonaceous film; an overlapping step in which a plurality of carbonaceous films obtained in the carbonaceous film conversion step is overlapped with one another; and a step in which the overlapped carbonaceous films obtained in the overlapping step are subjected to hot pressing.

The hot pressing step includes a first hot pressing step in which a pressure of 20 kg/cm$^4$ or less is applied to the films within a temperature range of 2800° C. or lower; and a second not pressing step in which a pressure of 20 kg/cm$^2$ or more is applied to the film within a temperature range of 2800° C. or higher.

<Heat Insulation Material 103>

The heat insulation material 103 is a heat insulation sheet obtained by allowing an unwoven fabric 107 with a thickness of 0.05 to 1.0 mm to include silica aerogel having a nanosized porous structure. A heat conductivity thereof is 0.01 to 0.1 W/m·K.

In general, a heat conductivity of an unwoven fabric is 0.030 to 0.060 W/m·K, and the value can be regarded almost as a sum of those of a solid heat conductive component of fibers in the unwoven fabric, and a heat conductive component of the air (nitrogen molecules) present in voids of the unwoven fabric.

The above-mentioned heat conductivity can be realized by including, in voids of the unwoven fabric, silica aerogel as a low-heat conductivity material, (generally considered as 0.010 to 0.015 W/m·K).

In general, a heat conductivity of the still air at ordinary temperature is considered as around 0.026 W/m·K, and the heat conductivity of the unwoven fabric 107 is larger than the value of the still air.

As a feature of the heat insulation material 103, the heat insulation material 103 is the only heat insulation sheet that has a heat conductivity smaller than that of the still air.

The heat insulation material 103 has a water-repellant property and sound-absorbing property besides a heat insulation property, and a certain type of unwoven fabric (e.g. an inorganic fiber such as glass wool or rock wool) can also be selected to impart flame retardance or heat resistance.

<Heat Conductivity of the Heat Insulation Material 103>

A beat conductivity of the heat insulation material 103 used in the present embodiment is within a range of 0.01 to 0.1 W/m·K.

When the heat insulation material 103 is used in a space with a thickness of 0.5 mm or less, the heat conductivity is preferably within a range of 0.01 to 0.05 W/m·K. The heat conductivity of the heat insulation material 103 is preferably within a lower range.

Additionally, when the heat insulation material 103 is used in a space with a thickness of 0.3 mm or less, the heat conductivity is more preferably within a range of 0.01 to 0.03 W/m·K. The heat conductivity of the heat insulation material 103 is preferably within a lower range.

The lower the heat conductivity of the heat insulation material 103 is, the higher its heat insulation effect is. When the heat conductivity of the heat insulation material 103 is lower, a thickness of the heat insulation material 103 required to obtain the same heat insulation effect can be made smaller. This is preferable when the heat insulation material 103 is used in a narrow space.

On the other hand, when the neat conductivity of the heat-insulation material 103 is higher than 0.1 w/m·K, the heat insulation effect of the heat insulation material 103 is deteriorated, and it is required to increase the thickness of the heat insulation material 103, in order to obtain a required heat insulation effect. Therefore, this is not preferable.

<Thickness of the Heat Insulation Material 103>

A thickness of the heat insulation material 103 may be within a range of 0.05 mm to 1 mm, and is preferably within a range of 0.05 mm to 0.2 mm.

When the thickness of the heat insulation material 103 is smaller than 0.05 mm, the heat insulation effect in the thickness direction is deteriorated. Therefore, if a low heat conductive material having an extremely low heat conductivity (that cannot exist at present) is not selected, the heat transfer from one surface to the other surface of the heat insulation material 103 in the thickness direction cannot sufficiently be reduced.

On the other hand, when the thickness of the heat insulation material 103 is larger than 1 mm, it becomes difficult to incorporate the composite material into recent thinner electronic apparatuses, as mentioned for the thickness of the graphite sheet 102.

When the thickness of the heat insulation material 103 is larger than 0.2 mm, a thickness of a composite material 106, in which the heat insulation material 103 and the graphite sheet 102 are combined, becomes larger, and, consequently, it becomes more difficult to incorporate the composite material into mobile apparatuses such as smart phones or tablets.

<Materials for the Heat Insulation Material 103>

As for a material for the neat insulation material 103 (unwoven fabric 107), inorganic fibers such as glass wool or rock wool, natural sheep wool heat insulation materials or cellulose heat insulation materials, ceramic foams, carbonated cork, foams, resin-based heat insulation materials such as polyurethane foams, phenol foams or polystyrene foams, and the like can be employed.

It is required that the material has a relatively flat surface, in order to secure the sufficient adhesion, to the graphite sheet 102. Therefore, among the above-mentioned materials, a resin-based heat insulation material is more preferable.

Furthermore, the lower the heat conductivity of the heat insulation material 103 is, the higher the heat insulation effect obtained by combining the heat insulation material 103 with the graphite sheet 102 is. Therefore, the heat conductivity of the heat insulation material 103 is preferably about 0.01 to 0.05 W/m·K, as shown above.

Specifically, a heat insulation material (0.01 to 0.024 W/m·K) obtained by impregnating an unwoven fabric with aerogel having a nanosized void structure that controls motion of air molecules is preferably used for the heat insulation material 103.

<Method for Producing the Heat Insulation Material 103>

One example of a method for producing the heat insulation material 103 is shown below.

(1) Mixing of materials: 1.4 wt % of concentrated hydrochloric acid (12N) as a catalyst is added to high molar ratio sodium silicate solution (a silicate aqueous solution with a Si concentration of 14%), thereby preparing a sol solution.

(2) Impregnation: the sol solution is poured onto an unwoven fabric (material: PET, thickness specification: 90 μm, weight per area: 12 g/m$^2$, size: 12 cm square), and the sol solution is allowed to penetrate into the unwoven fabric with a roll, thereby achieving the impregnation of the unwoven fabric with the sol solution.

(3) The unwoven fabric impregnated with the sol solution is placed between PP films (two sheets thereof with a thickness of 50 μm and with a size of B6), and this is allowed to stand at 23° C. (room temperature) for about 20 minutes to convert the sol to a gel.

(4) Thickness control: after confirmation of formation of the gel, the impregnated unwoven fabric with the films is passed through a two-shaft roller in which the gap is set to 190 μm (including a film thickness) to remove excess gel from the unwoven fabric, thereby controlling the thickness to a target of 100 μm.

(5) Curing: the gel sheet with films is charged to a container, and the container is charged into a thermo-hygrostat at 85° C./85 RH % for 3 hours for prevention of dryness, thereby allowing silica particles to grow therein (a silanol dehydration condensation reaction), and thus, a porous structure is formed therein.

(6) Film removal: the sheet is taken out of the curing container, and the films are removed from the sheet.

(7) First hydrophobization (hydrochloric acid-soaking step): the gel sheet is soaked in hydrochloric acid (6 to 12 N), and then, the gel sheet is allowed to stand at ordinary temperature (23° C.) for 1 hour to incorporate hydrochloric acid into the gel sheet.

(8) Second hydrophobization (siloxane treatment step): the gel sheet is soaked in, for example, a mixture solution of octamethyltrisiloxane, which is a silylating agent, and 2-propanol (IPA), which is an amphiphilic solvent. This is incubated in a thermostatic chamber at 55° C., and is reacted therein for 2 hours. When trimethylsiloxane bonds start to form, aqueous hydrochloric acid is eliminated from the gel sheet, and two-liquid separation will occur (the silylating agent in the upper layer and aqueous hydrochloric acid in the lower layer).

(9) Drying: the gel sheet is transferred to a thermostatic chamber at 150° C., and is dried therein for 2 hours.

<Thickness of the Graphite Sheet 102 and the Heat Insulation Material 103>

The thickness of the graphite sheet 102 is preferably about 0.1 mm, and the thickness of the heat insulation material 103 is preferably about 0.2 mm. In other words, the ratio of the thicknesses is favorably 1/2. The range for the ratio is favorably 1/1 to 1/3.

When the ratio is smaller than 1/1, the strength of the heat insulation material 103 may become low, and the heat insulation property may not be able to be maintained. When the ratio is larger than 1/3, sufficient heat insulation properties will be present, but meaningless aerogel may excessively be present.

<Support Layer 101A>

The graphite sheet 102 has electrically-conductive properties. Therefore, when it is used inside the electronic apparatus 100, there may be a case where short-circuit occurs due to its contact with an electronic component. When the composite material 106 according to an embodiment has a form in which the graphite sheet 102 is exposed on the inside of the electronic apparatus, an electrically-insulative film is preferably provided as a support layer 101A on the surface of the graphite layer 102.

As such an electric insulation film, a sheet such as of polyimide (PI), polyethylene terephthalate (PET), polyethylene (PE), polypropylene (PP), or polyester (SP) can be used. Although details will be described in <Method for combining the graphite sheet 102 and the heat insulation material 103> below, in view of a fusion property of the unwoven fabric to PET, the same material, namely PET, is preferable.

<Support Layer 101B>

As described above, the heat insulation material 103 has a form in which the unwoven fabric 107 is allowed to include silica aerogel 108 having a nanosized porous structure. However, since such silica aerogel 108 itself has a very fragile characteristic, the possibility of elimination or the silica aerogel 108 from the unwoven fabric 107 cannot be ruled out.

Therefore, when the composite material 106 according to an embodiment has a form in which the heat insulation material 103 is exposed on the inside of the electronic apparatus, an electrically-insulative film is preferably provided as a support layer 101B on the surface of the heat insulation material 103.

As such an electric insulation film, a sheet such as of polyamide (PI), polyethylene terephthalate (PET), polyethylene (PE), polypropylene (PP), or polyester (SP) can be used. Although details will be described in <Method for combining the graphite sheet 102 and the heat insulation material 103> below, in view of a fusion property of the unwoven fabric to PET, the same material, namely PET, is preferable.

<Method for Combining the Graphite Sheet 102 and the Heat Insulation Material 103>

The graphite sheet 102 and the heat insulation material 103 are combined without using any adhesive. That is, with regard to the composite material 106 according to an embodiment, outer peripheral portions of the composite material 106 are fixed onto one another by employing a thermocompression bonding method. If a bonding material is used therefor, problems of deterioration of heat properties, an increase in the number of steps, an increase in the thickness, etc. will arise. They are bonded to one another by melting fibers in the unwoven fabric 107. A bonding material or the like is not alternatively used therefor.

For the junction, without using the graphite sheet 102, bonding is carried out between the unwoven fabric 107 around the graphite sheet 102, and the lower support layer 101A and the upper support 101B. A fixing method therefor will be described with reference to FIGS. 2A to 2C.

For the fixation, thermocompression bonding only against four vertices (corners) of the peripheral portions of the heat insulation material 103 may be employed. However, thermocompression bonding against the four sides of the peripheral portions is preferable, in order to secure the more stable fixation. The entire peripheral portions are preferably subjected to thermocompression bonding, such that the inner silica aerogel 108 is completely sealed. Consequently, any fractions or the like of the silica aerogel 108 are not exposed on the exterior.

Figure 2A:
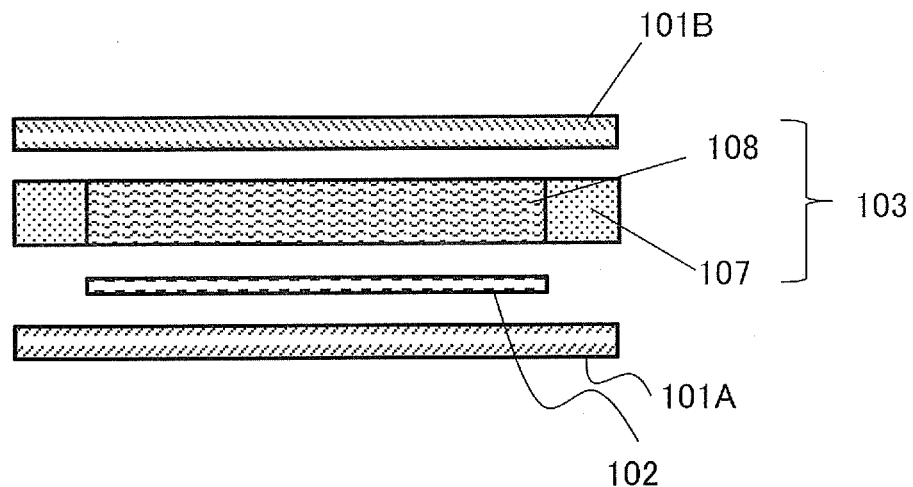
FIG. 2A shows a diagram that illustrates each component before a thermocompression crafting method for composite materials of embodiment.

More particularly, when the graphite sheet 102 and the neat insulation material 103 are combined with each other, the heat insulation material 103 is favorably made larger than the graphite sheet 102 in the planar direction, and the existence region of the silica aerogel 108 included in the heat insulation material 103 is favorably made so as to have almost the same size of the graphite sheet 102 in the planar direction, as shown in FIG. 2A.

This prevents the heat from, the graphite sheet 102 from transmitting to portions other than the silica aerogel 103, and thus, temperatures of any unintended portions will not increase. Furthermore, even if the heat is conveyed to the edge portions of the graphite sheet 102, the heat will not be transmitted to any unintended portions.

Figure 2B:
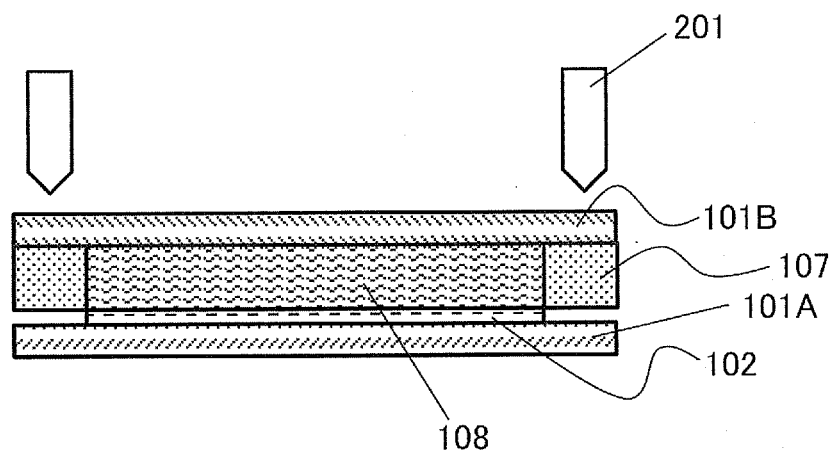
FIG. 2B shows a diagram that illustrates a thermocompression crafting method for composite materials of embodiment.

Additionally, as shown in FIG. 2B, with a thermocompression tool 201, heating and press bonding are carried out against the support layer 101A or the support layer 101B in outer peripheral regions in which the silica aerogel 108 included inside the heat insulation material 103 does not exist.

Figure 2C:
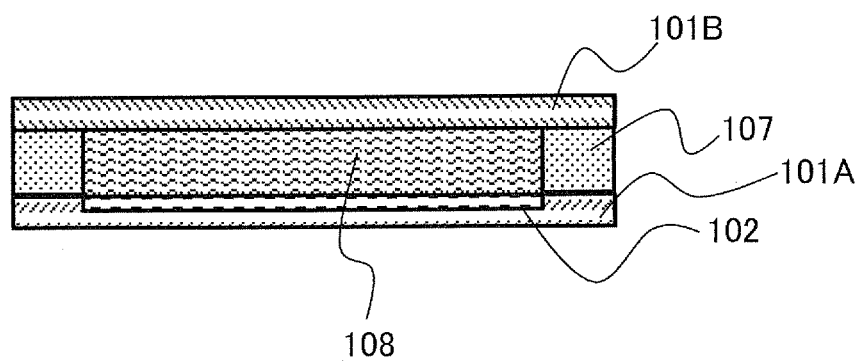
FIG. 2C shows a diagram that illustrates each component after a thermocompression crafting method for composite materials of embodiment.

According to the above, as shown in FIG. 2C, the support layer 101A, the unwoven fabric 107 in which the silica aerogel 108 inside the insulation material 103 does not exist, and the support layer 101B are fused to one another through melting of the unwoven fabric 107, the support layer 101A or the support layer 101B, and organic components of the support layer 101A or the support layer 101B. Consequently, it becomes possible to combine the graphite sheet 102 and the heat insulation material 103 without using any adhesive. Since the outer peripheral portions of the heat insulation material 103 are sealed, the silica aerogel 108 inside the heat insulation material 103 is not exposed on the exterior, and therefore, any influences are not exerted on surroundings.

Furthermore, the unwoven fabric 107 combines and integrates the silica aerogel 108, the support layer 101A and the support layer 101B, thereby stabilizing the strength. Any joining material such as a bonding material is not present between the silica aerogel 108 and the graphite sheet 102. Therefore, the thickness reduction becomes possible, and also, superior heat properties can be obtained.

A temperature and a pressure for thermocompression bonding are not particularly limited. However, it is at least required to instantaneously heat the materials at a temperature around a melting point of a, material of a insulation film used for the support layer 101A and the support layer 101B (e.g., at about 250° C. to 280° C.) while controlling positions of the materials.

Next, a production method therefor will be described with reference to the above <Method for producing the heat insulation material 103>.

As to a method for controlling a region of the heat insulation material 103 where the silica aerogel 108 is present, the following two methods can be mentioned.

The first method corresponds to masking of a portion, where the silica aerogel 108 should not be present, so as to prevent the portion from being impregnated with the sol solution, in (2) of the impregnation in the above-described.

<Method for producing the heat insulation material 103>. The portion which is not impregnated with the sol solution can be obtained as a portion on which the unwoven fabric 107 is exposed.

The second method corresponds to masking of a portion, where the silica aerogel 108 should not be present, in (8) of the second hydrophobization in the above-described <Method for producing the heat insulation material 103>. This prevents the portion from coming into contact with the silylating agent. That is, by preventing formation of trimethylsiloxane bonds therein in this way, such trimethylsiloxane bonds are not generated therein. Consequently, after the drying step, the silica aerogel present in the portion is self-destroyed due to its water absorption, and is easily eliminated therefrom. Thus, the portion can be arranged as a portion on which the unwoven fabric is exposed.

<Lamination Order in the Composite Material>

When the graphite sheet 102 is present between the heat generating component 406 and the heat insulation material 103 in the composite material 106 according to the embodiment of FIG. 1, the heat transfer from the neat generating component 406 is effectively diffused, thereby reducing the peak temperature.

When the heat insulation material 103 is present between the housing 401 and the graphite sheet 102, the heat insulation effect that prevents the neat transfer to the housing 407 becomes high.

Figure 3:
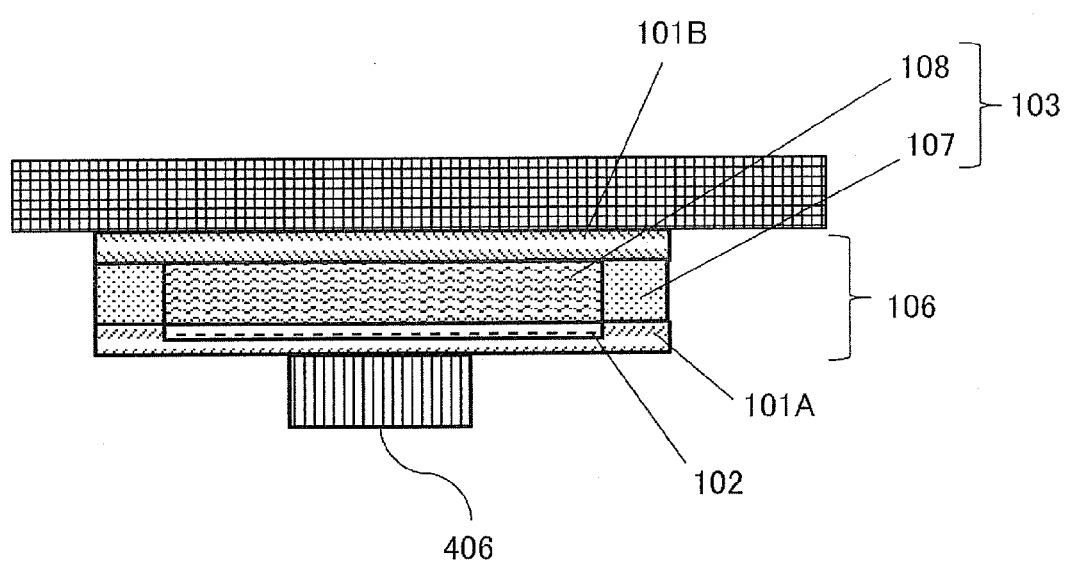
FIG. 3 is a diagram that illustrates a lamination order for a composite material of an embodiment.
Figure 4:
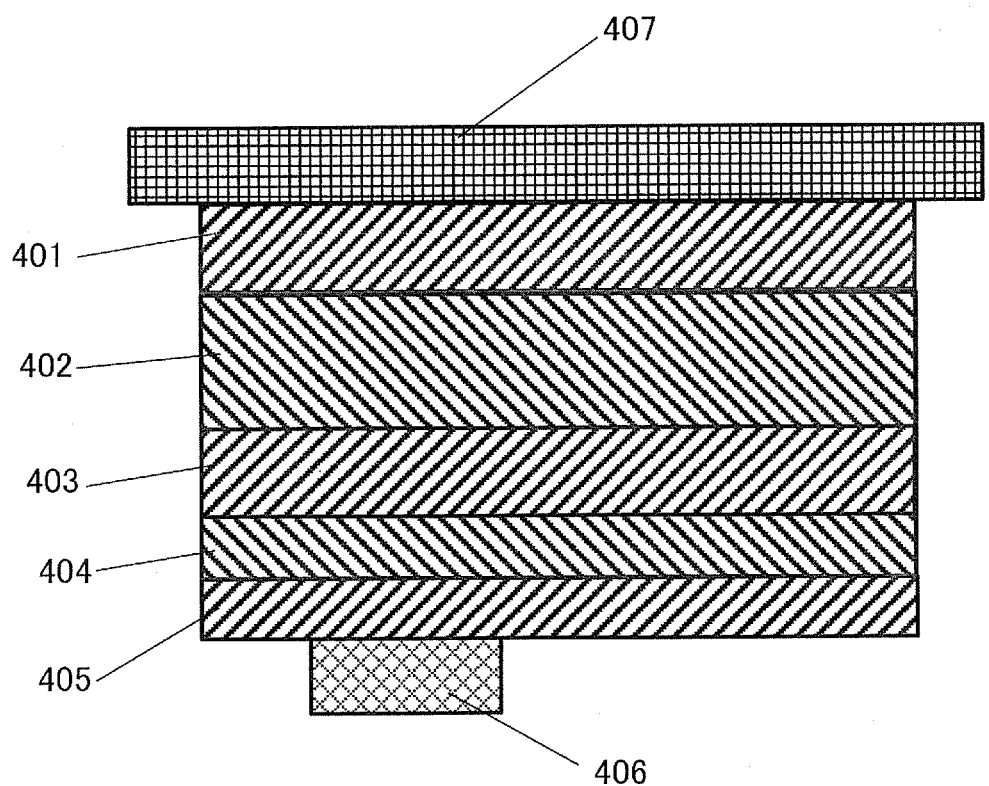
FIG. 4 is a diagram of a composite material with a conventional laminate structure.

Therefore, as shown in FIG. 3, lamination in the order of support layer 101A/graphite sheet 102/heat insulation material 103/support layer 101B, as viewed from the side of the neat generating component 406, is favorable.

In this case, the support layer 101A is imperative in order to prevent electrical leakage through the graphite sheet 102.

On the other hand, the support layer 101B may be required in order to prevent powder falling of the silica aerogel in the heat insulation material 103. However, in cases where adhesion between the unwoven fabric 107 and the silica aerogel 103 is stable, or where a space inside the housing of the electronic apparatus is required, the support layer 101B is not always required.

<Distance between the Heat Generating Component 406 and the Composite Material 106>

In FIG. 3, as to a distance between the heat generating component 406 and the composite material 106, the heat generation 406 and the graphite sheet 102 may be in contact with each other.

However, when they are in contact with each other, the peak temperature may become high. Therefore, it is preferable that the generation component 406 and the composite material 106 are not in contact with each other as much as possible.

<Conclusion and Advantages>

The composite material 106 according to the present embodiment includes: a graphite sheet 102 having a thickness of 100 μm or less, a heat conductivity in the planar direction of 1000 W/m·K or more, and a heat conductivity in the thickness direction of 20 W/m·K or less; and a heat insulation material 103 having a thickness within a range of 0.05 mm to 1 mm, and a heat conductivity within a range of 0.01 to 0.05 W/m·K.

Furthermore, in order to combine the graphite sheet 102 and the heat insulation material 103, the heat insulation material 103 is made larger than the graphite sheet 102, and the region of the silica aerogel included in the heat insulation material 103 is made so as to have the same size as the graphite sheet 102, and, additionally, any silica aerogel is not allowed to exist in the portions that are fused by a thermocompression bonding method.

According to the above, the support layers 101A and 101B, and portions of the heat insulation material 103 where the silica aerogel does not exist and on which the unwoven fabric is exposed are fused to one another by a thermocompression bonding method, and, consequently, the graphite sheet 102 and the heat insulation material 103 are combined with each other without using any bonding material or adhesive.

Additionally, when, a composite material 106 according to the present embodiment is used as a heat insulation member in an electronic apparatus that includes a housing 407 storing a heat generating component 406, heat transfer from the heat generating component 406 to the housing 407 can effectively be reduced.

<Temperature of the Housing>

By adhering, onto the inner surface of the housing 407, a composite material 106 in which the graphite sheet 102 and a heat insulation material 103 are combined with each other, the temperature of the housing 407 can significantly be lowered.

The reason is because the heat transfer from the heat generating component 406 is suppressed by the heat insulation material 103 as much as possible, the remaining heat that has passed through the heat insulation material 103 is further diffused by the graphite sheet 102 having high heat conductivity in the planar direction, and therefore, almost no heat is conveyed to the housing 407.

In fact, there are cases where a measure to prevent excess heat transmission to the housing 407 is required in order to prevent low-temperature burn injuries in smart phones or tablets. In this point, use of the composite material 106 according to the present embodiment for reduction of the heat transfer from the heat generating component 406 to the housing 407 meets such a requirement.

<Temperature of the Heat Generating Component>

The temperature of the heat generating component 406 alone can also be lowered by utilizing the composite material 106 according to the present embodiment. This is a result of the onset of the cooling effect due to the heat diffusion by the graphite sheet 102. The smaller the distance between the heat generating component 406 and the graphite sheet 102 is, the more remarkable the cooling effect can be obtained. In other words, when it is desired to suppress the temperature of the heat generating component 406 itself to a low range, the composite material 106 according to the present embodiment is useful.

A composite material according to the invention can be utilized inside a wide variety of electronic apparatuses. Furthermore, the composite material can be applied to products pertaining to heat, such as information equipment, mobile devices and displays.

What is claimed is:

1. A composite material, comprising:
   a heat dissipation sheet;
   a surface of a heat insulation material on one surface of the heat dissipation sheet; and
   support layers on the other surface of the heat dissipation sheet and the other surface of the heat insulation material, wherein
   silica aerogel is included between fibers in an inner region of the heat insulation material,
   an outer peripheral region of the heat insulation material includes the fibers,
   the heat dissipation sheet and the heat insulation material are fixed onto each other through the fibers, and
   the support layers are insulating films.

2. The composite material according to claim 1, wherein the heat insulation material has an area larger than that of the heat dissipation sheet, the inner region has the same area as that of the heat dissipation sheet, and the fibers in the outer peripheral portion and the support layer are fixed onto each other through fusion bonding.

3. The composite material according to claim 1, wherein the silica aerogel is not present in the outer peripheral region of the heat insulation material.

4. The composite material according to claim 1, wherein a bonding material is not present between the heat dissipation sheet and the heat insulation material.

5. The composite material according to claim 1, wherein the fibers are in the inner region and the outer peripheral region of the heat insulation material.

6. The composite material according to claim 1, wherein the support layers are each fixed onto the fibers in the outer peripheral region through fusion bonding.

7. The composite material according to claim 6, wherein the fusion bonding is placed on an entire circumference of the heat insulation material.

8. An electronic apparatus, comprising:
a housing;
a heat generating component; and
the composite material according to claim 1, wherein the composite material is placed between the housing and the heat generating component.

9. The composite material according to claim 1, wherein a material of the support layer is the same material as that of the fiber.

10. The composite material according to claim 1, wherein each of the inner region and the outer peripheral region is one.

11. A composite material, comprising:
a heat dissipation sheet;
a surface of a heat insulation material on one surface of the heat dissipation sheet; and
support layers on the other surface of the heat dissipation sheet and the other surface of the heat insulation material, wherein
silica aerogel is included between fibers in an inner region of the heat insulation material,
an outer peripheral region of the heat insulation material includes the fibers,
the heat dissipation sheet and the heat insulation material are fixed onto each other through the fibers, and
wherein the heat dissipation sheet is a graphite sheet, the graphite sheet has a thickness of 100 μm or less, a heat conductivity in the planar direction of 1000 W/m·K or more, and a heat conductivity in the thickness direction of 20 W/m·K or less, and the heat insulation material has a thickness within a range of 0.05 mm to 1 mm, and a heat conductivity within a range of 0.01 to 0.1 W/m·K.

* * * * *